US011291165B2

(12) United States Patent
Krijn et al.

(10) Patent No.: US 11,291,165 B2
(45) Date of Patent: Apr. 5, 2022

(54) DIMMING METHOD FOR CONSTANT LIGHT INTENSITY

(71) Applicant: SIGNIFY HOLDING B.V., Eindhoven (NL)

(72) Inventors: Marcellinus Petrus Carolus Michael Krijn, Eindhoven (NL); Rob Franciscus Maria Van Elmpt, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 173 days.

(21) Appl. No.: 16/635,792

(22) PCT Filed: Jul. 27, 2018

(86) PCT No.: PCT/EP2018/070460
§ 371 (c)(1),
(2) Date: Jan. 31, 2020

(87) PCT Pub. No.: WO2019/025317
PCT Pub. Date: Feb. 7, 2019

(65) Prior Publication Data
US 2021/0127593 A1    May 6, 2021

(30) Foreign Application Priority Data

Jul. 31, 2017  (EP) .................................. 17183929

(51) Int. Cl.
*A01G 7/04*      (2006.01)
*A01G 9/24*      (2006.01)
*H05B 47/105*    (2020.01)

(52) U.S. Cl.
CPC ............. *A01G 7/045* (2013.01); *A01G 9/249* (2019.05); *H05B 47/105* (2020.01)

(58) Field of Classification Search
CPC .. A01G 7/045; A01G 9/249; A01G 2031/006; A01G 22/00; A01G 24/00;
(Continued)

(56) References Cited

U.S. PATENT DOCUMENTS

2003/0005626 A1    1/2003  Yoneda et al.
2014/0259920 A1    9/2014  Wilson
(Continued)

FOREIGN PATENT DOCUMENTS

CN    104684380 A       6/2015
KR    102251140 B1 *    5/2021
(Continued)

*Primary Examiner* — Renan Luque (57) ABSTRACT

The invention provides a horticulture arrangement (1000) for a plant (1), the horticulture arrangement (1000) comprising (i) a horticulture lighting system (100) configured to provide horticulture light (101) to plants (1), (ii) one or more reflective elements (310) configured to reflect part of the horticulture light (101) to the plant (1), and (iii) a control system (200), wherein the control system (200) is configured to control one or more of a light intensity and a spectral distribution of the horticulture light (101) in dependence of the reflection of the horticulture light (101) by the one or more reflective elements (310).

20 Claims, 3 Drawing Sheets

(58) Field of Classification Search
CPC ........ A01G 25/16; A01G 31/00; A01G 31/02; A01G 31/06; A01G 9/00; A01G 9/16; A01G 9/246; A01G 9/26; H05B 47/105; H05B 45/00; H05B 45/20; H05B 45/22; H05B 45/33; H05B 47/175; A01C 1/00; A01C 1/02; A01K 1/0236; B65D 85/50; B65D 85/52; F21V 23/0442; F21V 5/048; F21V 7/0091; F21W 2131/40; G01N 33/0098; G05B 15/02; G06K 9/00657; Y02A 40/25; Y02B 10/30; Y02P 60/14; Y02P 60/21

See application file for complete search history.

(56) References Cited

U.S. PATENT DOCUMENTS

| | | | |
|---|---|---|---|
| 2014/0352211 | A1 | 12/2014 | Liotta |
| 2015/0319933 | A1* | 11/2015 | Li .................... A01G 9/249 47/58.1 LS |
| 2020/0068810 | A1* | 3/2020 | Pahlevaninezhad ... A01G 9/249 |

FOREIGN PATENT DOCUMENTS

| | | | | |
|---|---|---|---|---|
| WO | 2009098617 | A1 | 8/2009 | |
| WO | 2014098735 | A1 | 6/2014 | |
| WO | WO-2015093054 | A1 * | 6/2015 | ............. A01G 7/045 |

\* cited by examiner

DIMMING METHOD FOR CONSTANT LIGHT INTENSITY

CROSS-REFERENCE TO PRIOR APPLICATIONS

This application is the U.S. National Phase application under 35 U.S.C. § 371 of International Application No. PCT/EP2018/070460, filed on Jul. 27, 2018, which claims the benefit of European Patent Application No. 17183929.3, filed on Jul. 31, 2017. These applications are hereby incorporated by reference herein.

FIELD OF THE INVENTION

The invention relates to a horticulture arrangement comprising a horticulture lighting system. The invention further relates to a method for providing light to a plant, wherein such horticulture lighting arrangement may be applied. The invention also relates to a computer program product for executing such method. The invention also relates to a specific structure for hosting plants, which can be used in the horticulture arrangement and/or horticulture lighting method.

BACKGROUND OF THE INVENTION

US2014259920 describes a system comprising: a substantially closed container; a nutrient solution within the closed container; a seedling positioned within the nutrient solution; a grow light; at least one sensor adapted to observe growth of the seedling; and a controller coupled to the grow light and the at least one sensor adapted to: read information from the sensor to determine if growth has occurred; calculate a seedling stress duration, wherein the seedling stress duration commences with the positioning of the first seedling in the growing system and terminates when growth is observed in the first seedling; divide the seedling stress duration into a plurality of sub phases; determine a sub phase factor for a second seedling positioned in the growing system based on which sub phase the second seedling has reached based on an elapsed time; calculate the total number of on/off light cycles and a duration for each on/off cycle, wherein one cycle is turning the lights on and off;

and control the grow light to execute the total number of calculated on/off light cycles for the calculated duration of time the lights are on and time the lights are off during each cycle in the growing system.

US 2015/319933 A1 discloses a system for growing a plant, which system includes an inwardly reflective enclosure and preferably a top. A plurality of LEDs, preferably controlled by a control unit, selectively emit light onto predetermined portions of the plant. The control unit controls the growing conditions inside the enclosure with the use of air vents and air flow, an optional heater, and feedback from light intensity and color sensors. All of the light generated by the LEDs will be confined to the inside of the enclosure, increasing the efficiency of the system.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:

photoperiodism refers to the ability that plants have to sense and measure the periodicity of radiation (e.g. to induce flowering), phototropism refers to the growth movement of the plant towards and away from the radiation, and photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, especially for tomatoes, the red PPFD used may be typically 200 $\mu mol/sec/m^2$ and the ratio blue:red may be typically 1:7 (with red and blue ranging from 625-675 nm and from 400-475 nm respectively). Especially, the photosynthetic photon flux density may comprise about 10% blue and about 90% red. The PPFD can be determined from a photodiode or measured directly with a photomultiplier. The area in the PPFD refers to the local light receiving (plant) area of the space wherein the light source(s) are arranged. In case of a multi-layer system, it is the area of a relevant layer comprised in the multi-layer configuration; the PPFD may then be estimated in relation to each layer individually (see further also below). The area may be a value in an embodiment fed to the control unit manually, or may in an embodiment be evaluated (with e.g. sensors) by the control unit.

Plant growth depends not only on the amount of light but also on spectral composition, duration, and timing of the light on the plant. A combination of parameter values in terms of these aspects is called "light recipe" for growing the plant (herein, the words plant and crop can be interchanged).

LEDs can play a variety of roles in horticultural lighting such as:
1. Supplemental lighting: Lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant farms (also known as vertical farms or plant factories).
4. Tissue culture.

For providing supplemental lighting during autumn, winter and spring in green-houses (or all-year round in multi-layer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant may be rather limited, dependent upon the type of crop. At the same time, the lower parts of the plant are often most in need of supplemental light. The same dilemma persists when using solid state lighting that is mounted above the plants. Nevertheless, LED lighting, especially solid state lighting, has some advantages over discharge based lighting.

In circumstances that plants get insufficient light from natural sunlight, e.g. in northern regions or in so-called "plant farms" or "vertical farms" or "plant factories" that fully rely on artificial and well controlled conditions, there appears to be a need to provide light to the plant for growing (leaf and fruit), ripening and pre-harvest conditioning.

Light is not the only enabler for growth; also atmosphere (humidity level, $CO_2/O_2$ levels, etc.), water, nutrients and spore elements are of main importance. Temperature (and temperature profile/cycles over day/night) is also a key contributor to the success of growing plants. In the field of open air horticulture, it seems that there is a need for soilless or hydroponic horticulture, typically used for now in high profit/high value cultivation. Such methods are also based on non-natural growing of plants and could require or profit from artificial optimizations.

The space available for food production is becoming scarcer. Innovation in production methods is needed to deliver higher yields from smaller footprints, while becoming more sustainable (minimum use of energy and water). Producing food in closed environments such as plant farms is a method to meet these demands. In plant farms, food is grown in multiple layers, making much better use of the available space as compared to outdoor growth or growth in greenhouses. This implies that daylight will not be able to reach all plants and nearly all the light has to come from artificial lighting. For this, LED lighting is used. In plant farms, there is a need for providing to the plants a light treatment that is optimal at all times. At the same time, it is imperative that the light that is generated by the LED modules is used as efficiently as possible in order to reduce energy consumption and result in a profitable business. In plant farms, the production per unit of area is much higher than the production in the open field. The use of water is minimized. Plant diseases and pests can be prevented more easily. In the art, also the term "city farm" is used. Herein, the term "plant farm" is used, which may refers to the same, but without the possible association that that the farm is necessarily located in a city.

A high light use efficiency can be achieved by using materials with a high coefficient of reflection in between the plants and above the plants (in between the LED modules): in this manner, the light that ends up in between the plants will likely be reflected and gets a second chance of being intercepted by a plant. The drawback of this method of light recycling is that the light flux as experienced by the plants will not be constant over time: when the plants are relatively small, there will be much open space in between the plants. As a result, a lot of light will be recycled, resulting in a light intensity as experienced by the plants that is much higher than anticipated. When the plants become more mature, there will be less open space in between the plants and, hence, the effect of light recycling will be less. Overall, this method of light recycling will result in overexposure of the plants when they are young (or underexposure when they are mature), resulting in non-optimal growth.

Herein, amongst others, a growth system is proposed that allows locating each plant (or rather the combination of plant, substrate, and plant holder) in a base plate (hereafter called "floor") that has a high coefficient of reflection for light. Above the plants, the LED lighting modules are located. Above the modules or in between the modules there is a material that also has a high coefficient of reflection for light (hereafter called "ceiling" material). The fact that the materials of the floor and ceiling are highly reflective for a wide spectrum of light makes that any light that initially ends up in between the plants will likely be reflected (diffusely or specularly, depending on the material properties) and will get a second chance of becoming intercepted by a plant.

While resulting in a very efficient use of light (and energy), as mentioned before, this method of recycling light has a drawback: the light intensity (irradiance) as experienced by the plants will not be constant over time (note that the light intensity is expressed as the number of photons per unit of time and per unit of surface area, in units of $\mu mol/s/m^2$ (which may sometimes also be indicated as $\mu mol/m^2/s$). When the plants are relatively small, there will be much open space in between the plants. As a result, a lot of light will be recycled, resulting in a light intensity as experienced by the plants that can be much higher than anticipated.

A typical light intensity optimal for plant growth is 200 $\mu mol/s/m^2$. As a result of light recycling, the level as perceived by the plants can increase to almost twice this value, being 400 $\mu mol/s/m^2$. At this level, the plants are overexposed to light and the growth is sub-optimal. At low light intensities, photosynthesis (and hence growth) is seen to scale linearly with the light intensity. Upon increasing the light intensity further, gradually photosynthesis starts to saturate, implying that the growth efficiency reduces: a reduced growth efficiency implies that it will cost more energy to produce the same amount of biomass. This is the problem that we intend to solve. Another aspect of increasing the light intensity is that it leads to an increase of the risk that the plants develop growth disorders (such as tip burn). When the plants become mature, there will be less open space in between the plants and, hence, the effect of light recycling will become less (note that, in general, a leave of a plant reflects only a small portion of the light incident on that leave). When the plants start to overlap, most of the light will be absorbed by the leaves and almost no light will be recycled. In that case, the light intensity experienced by the plants will become nearly equal to the light intensity emitted by the LED modules. Note that in case the floor material does not reflect any light (e.g. a black surface), light recycling will not occur (except for the few photons that are reflected by the leaves and subsequently reflect from the ceiling material). In that case, the light intensity as experienced by the plants will coincide with the light intensity installed (i.e. the light intensity obtained by multiplying the number of photons per second emitted by an LED module and the number of modules installed per square meter).

Hence, it is an aspect of the invention to provide an alternative horticulture arrangement and/or horticulture lighting method, which preferably further at least partly obviates one or more of above-described drawbacks. The present invention may have as object to overcome or ameliorate at least one of the disadvantages of the prior art, or to provide a useful alternative.

In a first aspect, the invention provides a horticulture arrangement ("arrangement" or "system") for a plant, the horticulture arrangement comprising (i) a horticulture lighting system ("lighting system"), especially comprising one or more lighting devices (such as especially a plurality of lighting devices), configured to provide horticulture light ("light") to plants, (ii) one or more reflective elements (especially a plurality of reflective elements) configured to reflect part of the horticulture light to provide reflected horticulture light, and (iii) a control system ("controller" or "processor"), wherein the control system is configured to control one or more of a light intensity ("horticulture light intensity", or "light intensity" or "intensity") and a spectral distribution of the horticulture light in dependence of the reflection of the horticulture light (by the one or more reflective elements).

With such arrangement it is possible to take account of the actual light intensity the plants receive. With such arrangement it is also possible to prevent overload of the plants with light, but, which such arrangement it is also possible to save energy. The prescribed light intensity may be lowered when the plants are small, as due to reflection the plants receive more light, which can be up to a factor two of the prescribed intensity. When the plants are more mature, reflection will decrease and the chosen light intensity may converge to the prescribed light intensity.

The reflective elements are especially arranged to reflect part of unused light and/or reflected light to the plants, at least during part of the period the plants are in the arrangement. The term "unused light" may in embodiments refer to horticulture light that would otherwise be at least partially absorbed by a growth substrate (or growth medium), such as soil, particulate material, or water.

Hence, in yet a further aspect, the invention also provides a horticulture arrangement for a plant, the horticulture arrangement comprising (i) a horticulture lighting system configured to provide horticulture light to plants, (ii) one or more reflective elements configured to reflect part of the horticulture light (back) to the plant, and (iii) a control system, wherein the control system is configured to control one or more of a light intensity and a spectral distribution of the horticulture light in dependence of the (development of the) canopy. For instance, in embodiments the control system may be configured to control the light intensity of the horticulture light in dependence of the leaf area index. The leaf area index (LAI), indicates the leaf area per unit ground area (or substrate area). The term "canopy" refers to the above-ground portion of a plant community or crop, formed by the collection of individual plant crowns. The terms "reflecting to the plant" or "reflecting back to the plant" and similar terms may refer to the horticulture lighting system or the horticulture arrangement during use. In embodiments, it may also be defined as reflecting to a position where plants can grow or can be configured.

The term "horticulture arrangement" especially refers to an arrangement including a plant support (herein also indicated as "support") wherein or whereon plants may grow, a lighting system that is configured to direct horticulture light to the plant support wherein or whereon the plants may grow (or grow), and a control system that controls the horticulture light.

In use, the arrangement may include a plant support with a plant, or a plant support with a seed, or a plant support with a seedling, etc. Hence, in use the system (comprising the arrangement) may include a plant support with a plant, or a plant support with a seed, or a plant support with a seedling, etc.

Herein, the term "plant" is used for essentially all stages. The term "plant part" may refer to root, stem, leaf, fruit (if any), etcetera. The horticulture light is especially provided to the above-ground portion of the plant. The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially any species selected from medicinal plants, vegetables, herbs, sprouts, mushrooms, plants bearing nuts, plants bearing seeds, plants bearing flowers, plants bearing fruits, non-food crops such as grass and ornamental trees, etc. Even more especially, the term "plant" is used to refer essentially any species selected from medicinal plants, vegetables, herbs, sprouts, plants bearing nuts, plants bearing seeds, plants bearing flowers, plants bearing fruits, non-food crops.

The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crop and non-crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, Cucumber, Okra, Peanut, Potato, Corn, Pearlmillet, Rye, Alfalfa, Radish, Cabbage, Lettuce, Pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, Grapes, Almond, Strawberries, Pine apple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry.

The term "plant" herein may especially refer to Archaeplastida. The Archaeplastida are a major group of eukaryotes, comprising the red algae (Rhodophyta), the green algae, and the land plants, together with a small group of freshwater unicellular algae called glaucophytes. Hence, in embodiments the term "plant" may refer to land plants. In embodiments the term "plant" may (also) refer to algae (such as one or more of green algae and red algae and unicellular algae called glaucophytes).

The term "horticulture light" especially refers to light having one more wavelengths in one or more of a first wavelength region of 400-475 nm and a second wavelength region of 625-675 nm. The relative energies (Watt) that are provided in these regions may depend upon the type of plant and/or the growth phase. Hence, a recipe may define the ratio, optionally as function of time, for one or more types of plants. Especially, the term "horticulture light may refer to the PAR region (the photosynthetically active region from 400-700 nm). The term "horticulture light" may also be used for light that is applied to plants in hydroponic applications. As known in the art, in the PAR region (the photosynthetically active region from 400-700 nm) the reflection coefficient of leaves is very low (5-10%). Towards the near infrared, beyond 700 nm, the reflection coefficient increases. Hence, in specific embodiments, the horticulture light, may in addition to PAR light also include a small fraction (≤25% of the power, especially about at maximum 10% of the power) far red, i.e. 700-850 nm.

Especially, the term "horticulture arrangement" refers to a plant farm or climate cell, wherein the plants are grown under controlled conditions, and wherein the plants substantially do not receive day light. Further, such plant farm may be climatized, such as in the case of a climate cell. Hence, in embodiments the horticulture arrangement includes such plant farm or climate cell. In other embodiments, the plant farm or climate cell includes at least part of the horticulture arrangement. For instance, a climate cell may comprise the plant support and the lighting system, and the control system may be configured inside or external from the climate cell. Especially, a plant farm may comprise a climate cell.

The control system of such horticulture arrangement may control one or more of temperature, humidity, $CO_2$ level, irrigation, nutrient supply, light intensity of the horticulture light, air conditions including one or more of air temperature, air composition, air flow, etc. Such horticulture system may be configured to control one or more of these conditions at different locations in the arrangement. Hence, the irradiation with the horticulture light may in embodiments be done in response to e.g. one or more of time of the day, season of the year, (local) lighting conditions, age of plant, condition of the plant, planting period, etc. Hence, the irradiation with the horticulture light may in embodiments be done in response to plant related data, time related parameters, conditions to which the plant is subjected (such as natural light, temperature, relative humidity, $CO_2$ level, irrigation, nutrient supply, etc.), etc.

The horticulture lighting system is especially configured to provide horticulture light to plants. This may especially imply that the horticulture lighting system is configured to provide horticulture light in a direction of a plant support wherein or whereon plants may grow. Such plant support may be a tray. Especially, the term "plant support" may also refer to a plurality of plant supports, as the plants may be grown in layers one over the other ("multi-layer system). Hence, racks with each two or more plant supports, with over each plant support a light system. Hence, the term "lighting system" may also refer to a plurality of (individually controlled) lighting systems.

Further, the control system is configured to control one or more of a light intensity and a spectral distribution of the horticulture light. The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior. The phrase "one or more of a light intensity and a spectral distribution of the horticulture light" may refer to the total spectral distribution of the horticulture light, i.e. the power, especially in the visible, provided by the lighting system. However, in specific embodiments the control system may also be configured to control the spectral distribution, e.g. reducing or increasing parts of the spectral distribution relative to other parts of the spectral distribution. Hence, in embodiments the control system may be configured to control one or more of the intensity and the spectral distribution of the horticulture light, for instance in dependence of the one or more optical sensor signals.

As indicated above, the control system is configured to control one or more of a light intensity and a spectral distribution of the horticulture light in dependence of the reflection of the horticulture light by the one or more reflective elements.

The term "reflection" may refer to extent to which the horticulture light is reflected. If no light is reflected and the plants are mature, then the plants may essentially receive the target intensity of horticulture light, whereas when reflection of the horticulture light takes place, the plants receive a higher intensity. Hence, sensors close to the substrate (sensing upwards (or downwards when e.g. arranged over the substrate)) and/or sensors closer to the lighting devices than to the support (especially when sensing downwards) may be used to evaluate the reflection, i.e. the reflection of the horticulture light. This is herein also related to the gain (see further also below). The substrate (see also below) may be soil, or the substrate may in specific embodiments be water (for hydroponic applications). Another word for substrate may be "growth medium". The reflection may in embodiments also be wavelength dependence. In specific embodiments, the control system may control the spectral distribution of the horticulture light (also) in dependence of the spectral distribution of the reflected light The conditions to which the (growing) plants are subjected are in general defined in a recipe. Hence, the control system may grow the plants according to a recipe. Such recipe may include a light recipe, which defines a target horticulture light intensity. This may imply that the recipe defines a target horticulture light intensity over time. Alternatively or additionally, the recipe may define a target horticulture light intensity as function of parameters that are sensed, like intake of nutrients, leaf size, leaf shape, plant temperature, leaf temperature, root temperature, stem length, fruit size, the occurrence of new leaves, anomalies such as tip burn or diseases, etc. etc.

On top of such recipe, the control system may be configured to correct the light intensity that is imposed by the recipe to a light intensity, especially according to the recipe, but which is actually provided to the plants. In other words, the intensity of the horticulture light received by the plants may—due to such correction—comply with the target intensity, instead of being higher due to the reflection. As indicated above, the light intensity actually received by the plants may be higher, due to the reflection of the reflective elements, than as defined by the recipe. Therefore, the invention provides a dimming method, especially for a constant light intensity to the plants and/or an actual received light intensity that is about the target intensity, and that is not higher than a target light intensity due to reflection.

Likewise, the control system may be configured to correct the spectral distribution that is imposed by the recipe to a spectral distribution, especially according to the recipe, but which is actually provided to the plants. In other words, the spectral distribution of the horticulture light received by the plants may—due to such correction—comply with the target spectral distribution, instead of being different due to the reflection. The spectral distribution actually received by the plants may be different, due to the reflection of the reflective elements, than as defined by the recipe.

Therefore, in embodiments the control system is configured to control the horticulture light according to a predefined light recipe, wherein the light recipe includes information on one or more of (i) intensity of the horticulture light as function of time, and (ii) spectral distribution of the horticulture light as function of time, whereby the light recipe defines a target horticulture light intensity (as function of the time) (and/or a target spectral distribution of the horticulture light (as function of the time)), and wherein the control system is further configured to control one or more of the light intensity and spectral distribution of the horticulture light (as function of the time) in dependence of the reflection of the horticulture light by the one or more reflective elements. By controlling the horticulture light in dependence of the reflection of the horticulture light, it is possible to provide a horticulture light intensity (and/or spectral distribution) to the plants that complies with the target horticulture light intensity (and/or spectral distribution) (thus taking into account the recycling of horticulture light by reflection).

The light recipe may define target light intensities per se but may also define spectral distributions, by which also a light intensity may be defined, as the intensities of the different light sources that may make up the spectral distributions have to be defined. The intensity targeted by the recipe may be adapted such, that the target intensity is indeed received by the plant. Hence, in an early stage, there may be a substantial reduction in light intensity, wherein in a later stage, the reduction may be small or there may be no reduction.

Therefore, (also) in specific conditions the control system is configured to control the intensity of the horticulture light such that overexposure with horticulture light is prevented.

The system may especially be based on a feed-back loop, such as with the use of sensors (see also below). In combination with predetermined relationships between sensor signal and (estimated) power received at the plants, the target intensity of the horticulture light can be modified to provide an intensity to the plants that is actually desired or needed. Hence, in further embodiments the control system is configured to control the intensity of the horticulture light according to a light recipe with a target intensity of the horticulture light, an wherein the control system is configured to adapt the horticulture light intensity of the horticulture light according the light recipe on the bases of a predetermined relation between light intensity in $\mu mol/s/m^2$ provided by the horticulture lighting system and light intensity effectively received by the plants. In yet embodiments, the control system is configured to control the spectral distribution of the horticulture light according to a light recipe with a target spectral distribution of the horticulture light, an wherein the control system is configured to adapt the spectral distribution of the horticulture light according the light recipe on the bases of a predetermined relation between spectral distribution provided by the horticulture lighting system and spectral distribution effectively received by the plants.

Hence, in embodiments the control system is at least configured to control the spectral distribution of the horticulture light (in dependence of the reflection of the horticulture light (by the one or more reflective elements)). Alternatively or additionally, in embodiments the control system is at least configured to control the intensity of the horticulture light (in dependence of the reflection of the horticulture light (by the one or more reflective elements)).

As indicated above, the arrangement may include reflective elements. Such reflective elements may include mirror-like elements that are configured to specularly reflect light and/or reflective elements that are configured to diffusively reflect light. For instance, the reflective element may include a metal coating, such as an aluminum coating. Alternatively, the reflective element may comprise a white paint, such as a Titania comprising paint. Combinations of different reflective elements may also be used. The reflective elements are especially configured to reflect at least 50% of the incoming horticulture light, such as at least 60%, like at least 70%, even more especially at least 80%, such as at least 90%. Hence, such reflective elements may be relatively highly reflective.

Though the lighting devices may in embodiments also include reflective elements, the invention especially relates to additional reflective elements that may be configured between lighting devices or behind lighting devices. Such reflective elements are herein also indicated as first reflective elements. Such reflective elements are especially configured to reflect horticulture light back in the direction of the support, especially light that would otherwise substantially be lost as it propagates between the lighting devices to a ceiling or backside of another other tray. Further, such reflective elements are especially configured in the horticulture arrangement such, that light that travels in a direction perpendicular to a horizontal and in a direction away from the support is reflected back for at least 50%, such as at least 60%, even more especially at least 70%, such as at least 80%, even more especially at least 90%. Hence, the arrangement may be such that a substantial part of the light propagating in the direction away from the support in a direction up, is reflected back again in the direction of the support. Hence, in embodiments backsides of trays may be reflective. For instance, at least 50% of the surface area of a backside of a tray, such as at least 60%, such as at least 70%, even more especially at least 80% of the backside of the tray may be reflective for horticulture light. Hence, in an aspect the invention also provides a tray having a reflective backside, and optionally a lighting device physically coupled to the backside. Therefore, in embodiments the horticulture arrangement comprises a plurality of lighting devices, wherein one or more reflective elements are configured to reflect horticulture light directed in the direction of the lighting devices, especially back in the direction of the plants (i.e. in the direction of the support). Therefore, in embodiments at least part of the reflected horticulture light is directed in the direction of the one or more lighting devices, wherein one or more (first) reflective elements are configured to reflect at least a part of the reflected horticulture light directed in the direction of the one or more lighting devices back to the plants.

In embodiments, one or more reflective elements may be configured between two adjacent lighting devices. In further embodiments, one or more reflective elements are configured may be configured downstream of the lighting devices, for light that can escape between two or more lighting devices away from the arrangement. Alternatively, one or more reflective elements may be configured upstream of the lighting devices, where one or more openings in or between the one or more reflective elements allow the horticulture light to propagate to the plants.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Likewise, in between the plants reflective elements may be configured. Such reflective elements are herein also indicated as second reflective elements. For instance, in embodiments the plants are grown in a substrate, and in between the plants one or more reflective elements may be configured. Hence, the reflective elements may be arranged over the substrate, with openings for the plants.

In embodiments, the invention provides a structure for hosting plants, wherein the plants can be positioned, and wherein in between the plants reflective elements may be configured. Hence, in yet a further aspect, the invention also provides such structure per se, such as especially a structure for hosting the plants, wherein the structure comprises plant positions where the plants can be positioned, and intermediate parts between the plant positions, wherein one or more intermediate parts comprise one or more (second) reflective elements. Optionally, the structure may further comprise one or more optical sensors configured to sense reflected horticulture light. The phrase "sensing horticulture light" and similar phrases refer to sensing horticulture light that is directly received by the sensor as well as is received after one or more reflections.

The reflective element may comprise a plate with a reflective surface. In other embodiments, the reflective element is a reflective coating on another element. In embodiments the reflective element may be a reflective foil. For instance, a reflective foil may be configured over a substrate, such as a solid substrate, or a reflective board may float on water, wherein there are holes configured in the reflective foil or reflective board wherein plants can be configured (or through which stems may grow). A reflective foil or a reflective board may provide a plurality of intermediate reflective parts.

Further, such reflective elements are especially configured in the horticulture arrangement such that light that travels in a direction perpendicular to a horizontal and in a direction of the support, but does not reach a part of a plant, is reflected back for at least 50%, such as at least 60%, even more especially at least 70%, such as at least 80%, even more especially at least 90%. Hence, the arrangement may be such that a substantial part of the light propagating in the direction to the support in a direction down, is reflected back again in the direction of the support. Hence, in embodiments the intermediate parts may be reflective. For instance, at least 50% of the surface area of the intermediate parts, such as at least 60%, such as at least 70%, even more especially at least 80% of the intermediate parts may be reflective for horticulture light. This may especially apply in a stage where no plants are available or wherein the plants are in an early growth stage. Therefore, in embodiments the horticulture arrangement comprises a structure for hosting the plants, wherein the structure comprises plant positions where the plants can be positioned, and intermediate parts between the plant positions, wherein one or more intermediate parts comprise one or more (second) reflective elements.

Hence, the horticulture arrangement may in specific embodiment comprise a structure comprise a support with on the support or on the substrate one or more (second) reflective elements) and above the plants an arrangement of one or more (first) reflective elements. Hence, in embodiments one or more reflective elements below at least part of the canopy and one or more reflective elements above the canopy may be arranged.

The horticulture system thus comprise one or more reflective elements, of which one or more may be configured as first reflective elements and/or one or more may be configured as second reflective element. When there are both first and second reflective elements, the horticulture system may thus comprise at least two reflective elements.

As indicated above, the control system may control the horticulture light as function of (a sensor signal of) an optical sensor. Therefore, in embodiments the horticulture arrangement may further comprise one or more optical sensors configured to sense reflected horticulture light and to generate (one or more) corresponding optical sensor signals, wherein the control system is configured to control light intensity of the horticulture light in dependence of the optical sensor signals. When relative much horticulture light is reflected, the sensor will sense more radiation then when substantially all horticulture light is absorbed by the plants. Optical sensors may be configured to sense the horticulture light. As in embodiments the spectral distribution of the horticulture light may be variable, in such embodiments also optionally a sensor may be applied that is selective for (a part of) one of the above indicated wavelength ranges. Alternatively or additionally, one or more sensors may be applied that are able to sense both in the blue and in the red. In specific embodiments, one or more optical sensors (may be applied which) include a channel for sensing red horticulture light and a channel for sensing blue horticulture light. In specific embodiments, one or more optical sensors (may be applied which) include a channel for sensing red horticulture light and a channel for sensing far red horticulture light. In specific embodiments, one or more optical sensors (may be applied which) include a channel for sensing blue horticulture light, a channel for sensing red horticulture light, and a channel for sensing far red horticulture light. As the recycling of the types of red light may be different, the control system may with such sensors discriminate between these types of light and control the spectral distribution of the horticulture light (which may optionally include far red light).

An optical sensor may in embodiments be configured close to the substrate, i.e. closer to the substrate than to a lighting device. An optical sensor may in embodiments also be arranged closer to a lighting device than to the substrate. In the former embodiments, the sensor may be configured to sense upwards. When leaves grow, reflection will reduce, and the sensor will receive less radiation. In the latter embodiments, the sensor may be configured to sense downwards. When leaves grow, light uptake will increase, light reflection by the substrate, support, or reflective elements close to the substrate will decrease, and thus the reflection will reduce, and the sensor will receive less radiation.

Therefore, in embodiments, wherein the horticulture arrangement is configured for growth of plants in a growth medium, wherein one or more lighting devices are arranged above the growth medium at a lighting device height of (h1) from the growth medium, one or more first optical sensors are arranged at a sensor height (h2) selected from the range of 0-80% of the lighting device height (h1), such as 0-50%, like 0-40%, such as 0-20% of the lighting device height (h1). Such sensors may (in embodiments) be relatively close to the support. As indicated above, especially the one or more first optical sensors may be configured with sensor surfaces directed upwards. Further, especially one or more of the one or more first optical sensor are configured to view more than one plant. This may be useful in order to improve the accuracy of the sensor reading in view of the fact that the sensor reading is derived from light coming from a larger area, thereby largely averaging out any differences between plants.

Alternatively or additionally, in embodiments, wherein the horticulture arrangement is configured for growth of plants in a growth medium, wherein one or more lighting devices are arranged above the growth medium at a lighting device height of (h1) from the growth medium, (also) one or more second optical sensors may be arranged at a sensor height (h2) selected from the range of 50-150% of the lighting device height (h1). As indicated above, especially the one or more second optical sensors are configured with sensor surfaces directed downwards. Further, especially one or more of the one or more second optical sensor are configured to view more than one plant. This may be useful in order to improve the accuracy of the sensor reading in view of the fact that the sensor reading is derived from light coming from a larger area, thereby largely averaging out any differences between plants.

Alternatively or additionally, sensors may be configured close to the support, such as the structure, but e.g. 5-40% of the lighting device height above the support, such as the structure, and face downwards.

Especially, in embodiments one or more optical sensors may be configured to essentially only receive reflected horticulture light. This may especially apply to sensors that are configured close to the lighting devices, when such lighting devices are arranged over the plants/over the structure, and are configured to sense downwards, and/or when such sensors are configured downstream of the lighting devices.

Therefore, in specific embodiments one or more optical sensors comprise sensor surfaces, wherein the sensor surfaces are configured to receive no direct horticulture light. Hence, the sensors may not be in a direct line of sight of the lighting devices. Or, the lighting devices may not be in a direct line of sight of the sensors.

The optical sensor may include a sensor that is configured to sense light, such as without specific directional information, such as e.g. a photocell. In specific embodiments, the optical sensor may include a camera, such as a CCD camera. The light intensity received by the camera can be used to evaluate (also) the reflection of the horticulture light by the reflective elements. Additionally, or alternatively, such camera can be used to evaluate the (development of the) canopy. Such camera may also be used to evaluate (with the control system) a parameter related to the number and/or sizes of the leaves, such as the leaf area index. In specific embodiments, the control system may control the horticulture light (intensity) based on a predetermined relation between a parameter related to the number and/or sizes of the leaves and the light intensity effectively received by the plants. In this way, the horticulture light (intensity) may be controlled to provide an effective light intensity that e.g. complies with a target light intensity defined by a light recipe. Cameras may in embodiments especially be arranged at a sensor height (h2) selected from the range of 50-150% of the lighting device height (h1).

With such system and/or arrangement it may also be possible to dynamically control the system and/or arrangement, e.g. day-by-day adapted, including (re)acting on the growing plant, such as adapting e.g. the lighting conditions and/or other conditions to the physical size of the plant, etc.

As indicated above, the horticulture arrangement may thus comprise a horticulture lighting system for horticulture lighting (as well as a plant that may receive the horticulture light during use of the system). Herein, the horticulture arrangement is especially explained in relation to a situation wherein plants are available. However, the horticulture arrangement is hereby also claimed per se.

The horticulture lighting system comprises a lighting device which is especially used to provide (optionally after some modification of the spectral distribution of the light of the lighting device) the horticulture light. The term "horticulture light" especially refers to the light that is provided by the system (during use of the system) and which can be provided to one or more parts of the plant. The term "light" especially refers to visible light, but may in embodiments also refer to one or more of UV radiation and infrared radiation. The light generation device is especially a solid state lighting device. Further, the term "light generation device" may also refer to a plurality of (different) light generation devices. The lighting device(s) may optionally be color tunable. Hence, in yet a further aspect the invention also provides the horticulture lighting system per se.

For instance, in an aspect the invention also provides a horticulture lighting system configured to provide horticulture light, the horticulture lighting system comprising one or more lighting devices (especially a plurality of lighting devices) configured to provide the horticulture light, (ii) one or more optical sensors configured to sense reflected horticulture light and to generate (one or more) corresponding optical sensor signals, and (iii) a control system configured to control one or more of a light intensity and a spectral distribution of the horticulture light, especially at least the light intensity of the horticulture light, in dependence of the one or more optical sensor signals.

The horticulture arrangement, or the horticulture lighting system may be used in a method for providing horticulture light to plants. In yet a further aspect, the invention provides a method of providing horticulture light to plants in a horticulture arrangement comprising one or more reflective elements (configured to reflect part of the horticulture light to provide reflected horticulture), the method comprising providing the horticulture light to plants and controlling one or more of a light intensity and a spectral distribution of the horticulture light in dependence of the reflection of the horticulture light (by the one or more reflective elements). In yet a further aspect, the invention provides a method of providing horticulture light to plants in a horticulture arrangement comprising one or more reflective elements (configured to reflect part of the horticulture light to provide reflected horticulture), the method comprising providing the horticulture light to plants and controlling one or more of a light intensity and a spectral distribution of the horticulture light in dependence of the (development of the) canopy. For instance, in embodiments the control system may be configured to control the light intensity of the horticulture light in dependence of the leaf area index.

As indicated above, such method may be used in combination with the herein described horticulture arrangement or horticulture lighting system. Hence, in embodiments the horticulture arrangement or the horticulture lighting system are especially configured to execute the herein described method.

As indicated above, a horticulture lighting system may be configured such that x µmol/sec/m$^2$ light is provided. Likewise, the method may imply providing with a horticulture lighting system x µmol/sec/m$^2$ light. However, due to reflection, the actual received intensity may be n*x µmol/sec/m$^2$, wherein n≥1, such as 1≤n≤2. With the method, the intensity can be controlled such that the intensity that is provided by the lighting system is corrected for the reflection, such that the plant essentially receives the target value of x µmol/sec/m² light. With time, n may converge from about 2 to 1, as the canopy closes. Of course, the final value may also depend upon the distance between the plants. However, under optimal conditions, there is relatively little space between adjacent mature(d) plants, though this may depend upon the type of crop. The reflection of the horticulture light by the one or more reflective elements is substantially zero when essentially no light is redirected by the reflective elements. Of course, there may be some redirection by the plant itself. The reflection of the horticulture light by the one or more reflective elements may be very high when the plants are small, or even below the substrate level.

As indicated above, the inventive controlling may be a controlling on top of basic controlling, such as on the basis of a light recipe. Hence, in embodiments the method comprising controlling the horticulture light according to a predefined light recipe, wherein the light recipe includes information on one or more of (i) intensity of the horticulture light as function of time, and (ii) spectral distribution of the horticulture light as function of time, whereby the light recipe defines a target horticulture light intensity and/or a target spectral distribution of the horticulture light, and controlling the one or more of the light intensity and spectral distribution of the horticulture light in dependence of the reflection of the horticulture light (by the one or more reflective elements).

The phrase, "controlling the horticulture light" and similar phrases especially imply controlling one or more lighting properties of the horticulture light, such as one or more of (i) intensity (especially in Watts or photons), (ii) spectral distribution, (iii) color point, (iv) color temperature, etc. of the horticulture light. The phrase, "controlling the horticulture light intensity" and similar phrases especially imply controlling the integral intensity (especially in Watts or photons). By controlling the spectral distribution, spectral ranges, such as blue, red, and/or far red, may (independently) be controlled.

Reflection may thus lead to a higher gain of the horticulture light. This gain is a function of the amount and number of leaves. With the optical sensor(s) a gain may be retrieved or with a predetermined gain function (over time) the gain may be estimated. On the basis thereon, the control system may adapt the horticulture light (intensity and/or spectral distribution) to have the plants receive about the target light and not a higher intensity (or other spectral distribution) due to the reflection. Herein, the term reflection may also refer to "multiple reflection". The invention may thus allow for a correction for (multiple) reflection(s) of the light at reflective elements.

Therefore, in yet a further aspect the invention also provides a computer program product, when running on a computer which is functionally coupled to or comprised by the control system of the horticulture arrangement, such as e.g. described herein, and which horticulture arrangement comprises one or more reflective elements, is capable of bringing about the method as described herein.

Therefore, the invention further provides a computer program enabled to carry out the method as defined herein, for instance when loaded on a computer. In yet a further aspect, the invention provides a record carrier (or data carrier, such as a USB stick, a CD, DVD, etc.) storing a computer program according to claim. Hence, the computer program product, when running on a computer or loaded into a computer, brings about, or is capable of bringing about, the method as described herein.

The record carrier or computer readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory. Additional memories may also be used. The memory may be a long-term, short-term, or a combination of long- and-short term memories. The term memory may also refer to memories. The memory may configure the processor/controller to implement the methods, operational acts, and functions disclosed herein. The memory may be distributed or local and the processor, where additional processors may be provided, may be distributed or singular. The memory may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The controller/processor and the memory may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit.

BRIEF DESCRIPTION OF THE DRAWINGS

Embodiments will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
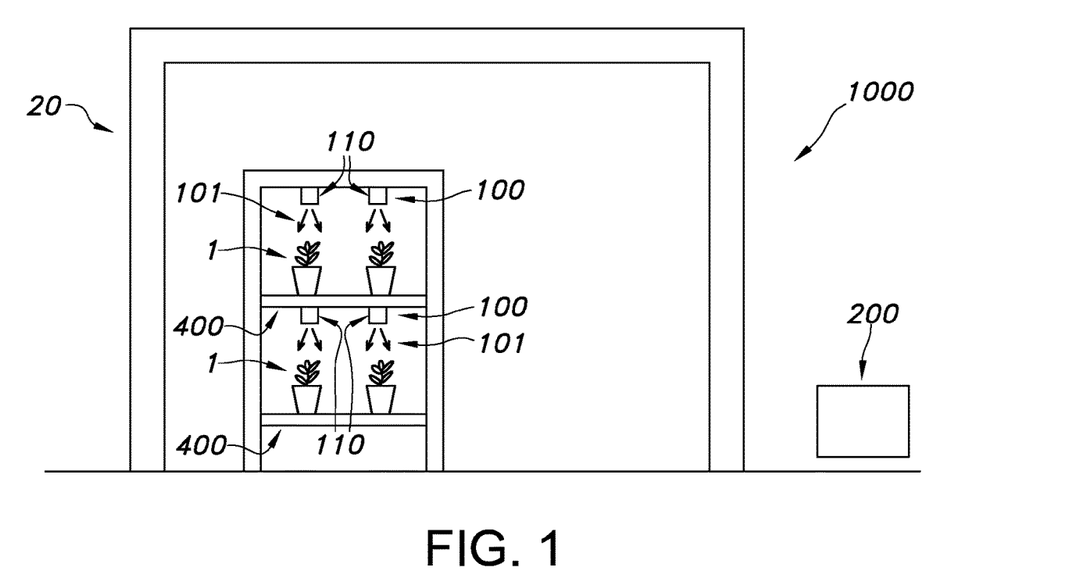
FIG. 1 schematically depicts a horticulture arrangement.
Figure 2:
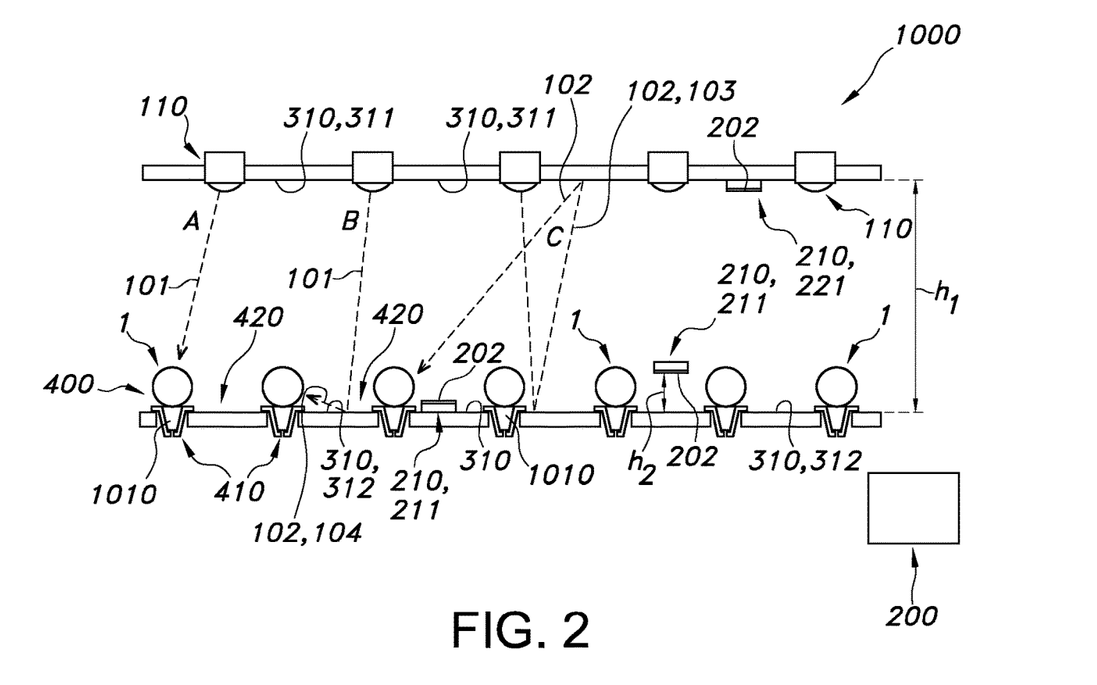
FIG. 2 schematically depicts a horticulture arrangement with a cross-section of a typical growth layer.

In plant farms (see: FIG. 1), the production per unit of area is much higher than the production in the open field. The use of water is minimized. Plant diseases and pests can be prevented more easily. Typically, in a plant farm, plants are grown in climate cells. Each cell is equipped with one or more racks. Each rack has multiple layers for growing plants. FIG. 2 schematically depicts a cross-section of a layer for growing plants according to an embodiment of the invention. The plants (herbs such as basil or leafy vegetables such as lettuce) are grown hydroponically (the plants are grown without soil, using mineral or organic nutrients dissolved in water).

FIG. 1 schematically shows an embodiment of a horticulture arrangement 1000 for a plant 1. The horticulture arrangement 100 comprises a horticulture lighting system 100 configured to provide horticulture light 101 to plants 1 and a control system 200. The control system 200 is configured to control one or more of a light intensity and a spectral distribution of the horticulture light 101. The lighting system may comprise one or more lighting devices 110. Reference 20 indicates a climate cell. The interior may only receive artificial light from the lighting devices 110, and essentially no daylight. The plants are grown on racks. Reference 400 indicates a structure on or in which the plants 1 can be arranged.

Amongst others, herein a growth system is proposed that allows us to locate each plant (or rather the combination of plant, substrate, and plant holder) in a base plate (hereafter called "floor") that has a high coefficient of reflection for light. Above the plants, the LED lighting modules are located. Above the modules or in between the modules there is a material that also has a high coefficient of reflection for light (hereafter called "ceiling" material), see e.g. FIG. 2. The fact that the materials of the floor and ceiling are highly reflective for a wide spectrum of light makes that any light that initially ends up in between the plants will likely be reflected (diffusely or specularly, depending on the material properties) and will get a second chance of becoming intercepted by a plant.

FIG. 2 shows an embodiment wherein one or more reflective elements 310 configured to redirect the horticulture light 101 to the plants 1. Further, the control system 200 is configured to control one or more of a light intensity and a spectral distribution of the horticulture light 101 in dependence of the reflection of the horticulture light 101 by the one or more reflective elements 310.

The ray denoted by A is intercepted by a plant. The ray denoted by B initially ends up in between the plants and is diffusely reflected from the floor material and subsequently intercepted by a plant. Ray C initially ends up in between the plants and subsequently is reflected by the ceiling material before being intercepted by a plant. Hence, horticulture light 101 may be reflected to provide reflected horticulture light, which is indicated with reference 102. Horticulture light reflected at the plant side, such as by one or more reflective elements 310 at the plant side, may be indicated as reflected horticulture light 104. Horticulture light reflected at a side (well) above the plants, such as by one or more reflective elements 310 at the lighting device side, may be indicated as reflected horticulture light 103.

As shown in FIG. 2, the horticulture arrangement 1000 comprises a structure 400 for hosting the plants 1. The structure 400 comprises plant positions 410 where the plants 1 can be positioned, and intermediate parts 420 between the plant positions 410. Here, one or more intermediate parts 420 comprise one or more reflective elements 310.

Hence, the one or more reflective element 310 may comprise first reflective elements 311. These are especially arranged above the plants. The one or more reflective element 310 may comprise second reflective elements 312. These are especially arranged below at least part of the canopy, such as on the support. Therefore, the one or more reflective elements 310 may comprise one or more of (i) one or more first reflective elements 311, and (ii) one or more second reflective elements 312.

Further, the horticulture arrangement 1000 may comprise one or more optical sensors 210 configured to sense reflected horticulture light 101 and to generate corresponding optical sensor signals. As indicated above, the control system is configured to control light intensity of the horticulture light 101 in dependence of the optical sensor signals.

Thus, FIG. 2 discloses a structure (400) for hosting the plants (1), wherein the structure (400) comprises plant positions (410) where the plants (1) can be positioned, and intermediate parts (420) between the plant positions (410), wherein one or more intermediate parts (420) comprise one or more reflective elements (310), and wherein the structure (400) further comprises one or more optical sensors (210) configured to sense reflected horticulture light.

Especially, the horticulture arrangement 1000 is configured for growth of plants 1 in a growth medium 1010. The one or more lighting devices 110 are arranged above the growth medium 1010 at a lighting device height of h1 from the growth medium 1010. One or more first optical sensors 211 are arranged at a sensor height h2 selected from the range of 0-80%, such as 0-40% of the lighting device height h1. Especially, the one or more first optical sensors 211 are configured with sensor surfaces 202 directed upwards. These sensors can be configured e.g. at the "floor". Especially, one or more of the one or more first optical sensor 211 are configured to view more than one plant 1.

Further, alternatively or additionally, one or more lighting devices 110 are arranged above the growth medium 1010 at a lighting device height of h1 from the growth medium 1010, wherein one or more second optical sensors 221 are arranged at a sensor height h2 selected from the range of 50-150% of the lighting device height h1. These sensor can be configured at a "ceiling". Especially, the one or more second optical sensors 221 are configured with sensor surfaces 202 directed downwards. Further, especially one or more of the one or more second optical sensor 221 are configured to view more than one plant 1.

While resulting in a very efficient use of light (and energy), the horticulture arrangement 1000 as shown in FIG. 2 has a drawback: the light intensity (irradiance) as experienced by the plants will not be constant over time (note that the light intensity is expressed as the number of photons per unit of time and per unit of surface area, in units of $\mu mol/s/m^2$). When the plants are relatively small, there will be much open space in between the plants. As a result, a lot of light will be recycled, resulting in a light intensity as experienced by the plants that can be much higher than anticipated.

Figure 3:
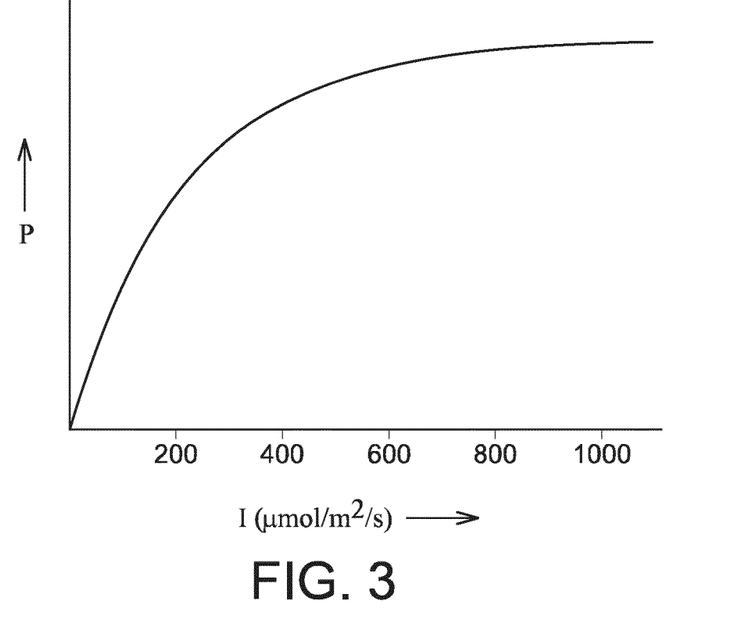
FIG. 3 schematic representation of a measured photosynthesis P ($CO_2$ assimilation rate) versus irradiance for lettuce growth (in µmol/m²/s light)

A typical light intensity optimal for plant growth is 200 µmol/s/m². As a result of light recycling, the level as perceived by the plants can increase to almost twice this value, being 400 µmol/s/m². At this level, the plants are overexposed to light and the growth is sub-optimal. At low light intensities, photosynthesis (and hence growth) is seen to scale linearly with the light intensity. Upon increasing the light intensity further, gradually photosynthesis starts to saturate, implying that the growth efficiency reduces (see also FIG. 3): a reduced growth efficiency implies that it will cost more energy to produce the same amount of biomass. This is the problem that we intend to solve.

Another aspect of increasing the light intensity is that it leads to an increase of the risk that the plants develop growth disorders (such as tip burn).

When the plants become mature, there will be less open space in between the plants and, hence, the effect of light recycling will become less (note that, in general, a leave of a plant reflects only a small portion of the light incident on that leave).

When the plants start to overlap, most of the light will be absorbed by the leaves and almost no light will be recycled. In that case, the light intensity experienced by the plants will become nearly equal to the light intensity emitted by the LED modules.

Note that in case the floor material does not reflect any light (e.g. a black surface), light recycling will not occur (except for the few photons that are reflected by the leaves and subsequently reflect from the ceiling material). In that case, the light intensity as experienced by the plants will coincide with the light intensity installed (i.e. the light intensity obtained by multiplying the number of photons per second emitted by an LED module and the number of modules installed per square meter).

Figure 4:
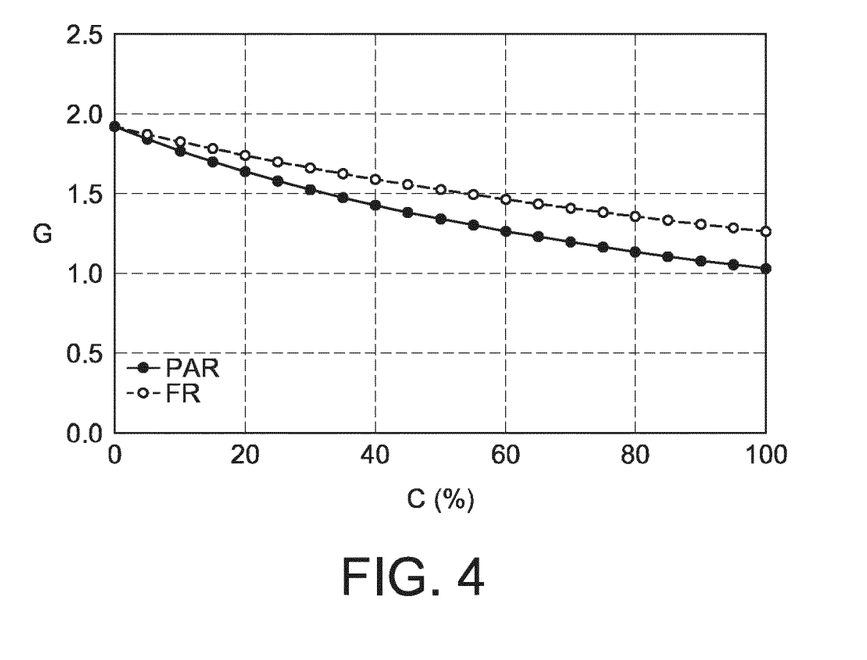
FIG. 4 shows: Gain versus coverage, calculated from equation 1, with $R_{Floor}$=80%, $R_{Ceiling}$=60%, and $R_{Plant}$=5% and 35% for the curves denoted by PAR and FR, respectively.

An embodiment will be discussed next with reference to FIG. 4. When the plants are relatively small, there will be much open space in between the plants. As a result, a lot of light will be recycled, resulting in a light intensity as experienced by the plants that can be much higher than anticipated. In FIG. 4, "C" indicates the coverage and "G" indicates the gain.

Consider as a reference the situation in which the floor material and ceiling material do not reflect any light. In that case, no light will be recycled and the light intensity as experienced by the plants equals the light intensity installed (aside from any light that ends up next to the growth layer).

Compared to this reference situation, in case the floor material and ceiling material do reflect light, the light intensity as experienced by the plants will be higher due to the effect of light recycling. The magnitude of this effect (i.e. the gain, relative to the reference situation) can be obtained by approximation from the following formula:

$$\text{Gain} = \frac{1}{1 - R_{Ceiling}[C_{Plant}R_{Plant} + (1 - C_{Plant})R_{Floor}]} \quad (1)$$

Here, $R_{Floor}$ and $R_{Ceiling}$ are the light reflection coefficients of the floor material and ceiling material, respectively. $C_{Plant}$ is the fraction of the floor area that is covered by the plants. $R_{Plant}$ is the reflection coefficient of the plants. See further below for typical values of these parameters.

Equation 1 shows that the value of the gain can be estimated from the coverage ($C_{Plant}$) and the reflective properties of the floor ($R_{Floor}$), the ceiling ($R_{Ceiling}$), and the plants ($R_{Plants}$).

Since in general the coverage is not known a priori, we propose to estimate the gain by one of the following methods:

1. use the reading of an optical sensor looking downward to the floor or . . .
2. the reading of an optical sensor looking upward to the ceiling, or . . .
3. a combination of the readings of a downward looking sensor and an upward looking sensor Let $L_{Emitted}$ be the light intensity emitted by the lamps (in µmol/s/m²). Let $S_{Downward}$ be the calibrated sensor reading (also in µmol/s/m²) of an optical sensor looking downward. Equally, let $S_{Upward}$ be the reading of a sensor looking upward.

It can be shown that, for each of the three abovementioned methods, the gain can be estimated as follows:

For a Sensor Looking Downward:

$$\text{Gain} \approx \frac{S_{Downward}}{L_{Emitted}} \frac{1}{C_{Plant}R_{Plant} + (1 - C_{Plant})R_{Floor}]}$$

For a Sensor Looking Upward:

$$\text{Gain} \approx \frac{S_{Upward}}{L_{Emitted}}$$

For the Combination of a Sensor Looking Downward and Upward:

$$\text{Gain} \approx \frac{1}{1 - R_{Ceiling}S_{Downward}/S_{Upward}]}$$

Of these three methods, method 1 is unattractive since it still requires knowledge of the plant coverage $C_{Plant}$ (unless the sensor is a camera, providing images from which the plant coverage can be determined). Method 2 is attractive since only one sensor is needed; it relies however on knowing the emitted light intensity $L_{Emitted}$. Method 3 is also attractive since knowledge of the emitted light intensity is not required. Since it relies on the ratio $S_{Downward}/S_{Upward}$, the sensors need to be calibrated only on a relative level, which is advantageous.

Typically the gain in light intensity, as perceived by the plants, versus plant coverage looks like depicted in FIG. 4. From this figure, one can infer that in this case initially the light intensity as perceived by the plants will be almost 2 times as large as the light intensity installed. Gradually when the plants grow taller, the light intensity reduces to a level that is close to the level installed.

Figure 5:
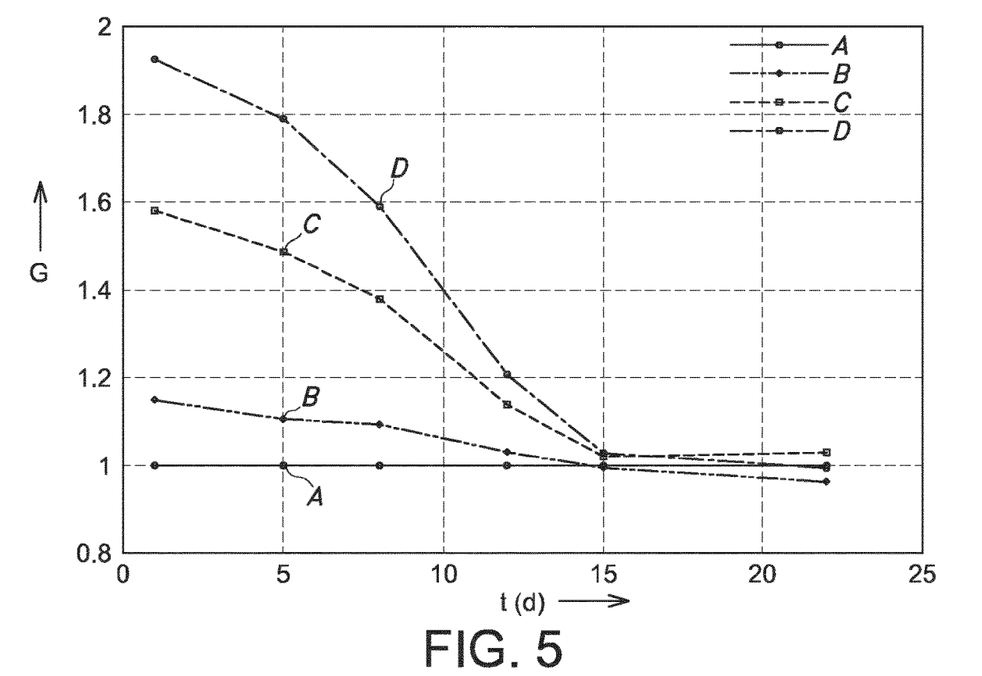
FIG. 5: Results of measurements of the gain in light intensity versus the age of the plants. The graphs denoted by A refer to the case where $R_{Floor}$=0% and $R_{Ceiling}$=0% (i.e. a black floor and ceiling). D refers to the case where $R_{Floor}$=80% and $R_{Ceiling}$=60% (i.e. a floor and ceiling that reflect light well)

We have performed experiments to measure this gain during growth, the results of which are shown in FIG. 5. The results are in line with the results of the model calculations as shown in FIG. 4. Note that FIG. 4 shows the gain factor as a function of coverage whereas FIG. 5 shows the gain ("G") as a function of time (in days).

The gain can be measured by means of a light sensor facing upward. First, the light intensity is measured for the situation in which there are no plants and the floor and ceiling material are made black. This is the reference light intensity (equal to the light intensity installed). Next, the light intensity is measured with the plants and the reflecting floor and ceiling material in place.

Plants are grown based on a light recipe: a light recipe provides a prescription of what level and spectrum of light to offer as a function of time during the day and during growth from day-to-day. For example, for lettuce, a typical light recipe would be to offer a light intensity 200 µmol/s/m² for 18 hours per day for the whole growth period from young plant to mature plant. Due to the aforementioned effect of light recycling on the light intensity as perceived by the plants, this light recipe cannot be maintained during growth.

As the main element of the invention, we propose to dim the light intensity (L) in response to (i) the gain from light recycling or (ii) plant coverage (cf. equation 1).

Let $L_0$ be the light intensity intended to be offered to the plants. In that case, the time-dependent dimmed level would be: $L(t) \approx L_0/Gain(t)$. Here, $L_0$ is the light intensity in case there is no light recycling (Gain=1). We can extend this to more complicated light recipes as follows. Assume $L_0(t)$ is the time-dependent light intensity (as perceived by the plants) that is supposed to be optimal for plant growth. In the case of non-negligible light recycling, we propose to dim the light intensity as follows: $L(t) \approx L_0(t)/Gain(t)$, i.e. using the inverse proportional relationship between emitted light and gain.

In general, next to emitting visible light, lighting modules are often equipped with LEDs that emit far-red light. Since the reflection coefficient of leaves for far-red (FR) light is rather large compared to that of PAR light, the gain factor for far-red light will also be larger. Also, the visible PAR light will result in fluorescence of the leaves. This fluorescence is also in the far-red region of the spectrum, thereby increasing the gain factor for the far-red light even more (see also FIG. 4). In other words, the ideal dimming factor will be dependent on the wavelength of the light offered to the plants.

As stated before, a light recipe provides a general prescription of how to adjust the light intensity and spectrum as perceived by a plant in order to result in optimal growth. This prescription covers the plant development from young plant to mature plant. Since the effect of light recycling alters the light intensity and spectrum as perceived by the plants, this effect has to be accounted for. Moreover, the amount of light recycling is specific for a plant farm and dependent on the growth layer configuration, the emission profile of the LED modules, and especially on the optical properties of the floor and ceiling material.

Taking into account these notions, the embodiment has the following features in order to be able to execute a general light recipe:

Light recipes for optimum growth of a choice of plant varieties are stored on a storage medium (e.g. a database in the cloud).

A user instructs the plant farm control system to execute one of the stored light recipes.

Sensors are used to measures properties of the plant growth. The sensor readings are used by an algorithm on the computer to ascertain the amount of light recycling taking place (i.e. the gain).

The sensors are optical sensors (e.g. a simple photodiode, an array of photodiodes with different spectral sensitivities, a spectrometer, or a (hyperspectral) camera). The sensors are located close to the ceiling and look downward towards the floor and/or are located close to the floor and look upward towards the ceiling. Preferably, the field of view of the sensor is such that substantially more than 1 plant is in the field-of-view.

The light intensity and spectrum are adjusted, based on the measured or estimated gain.

Based on the adjusted light setting, the power consumption of the lighting system is measured or estimated. This information is parsed to the climate control system. The climate control system executes an algorithm to take this information into account in order to improve the climate control. The climate control system is part of the plant farm control system.

Figure 6:
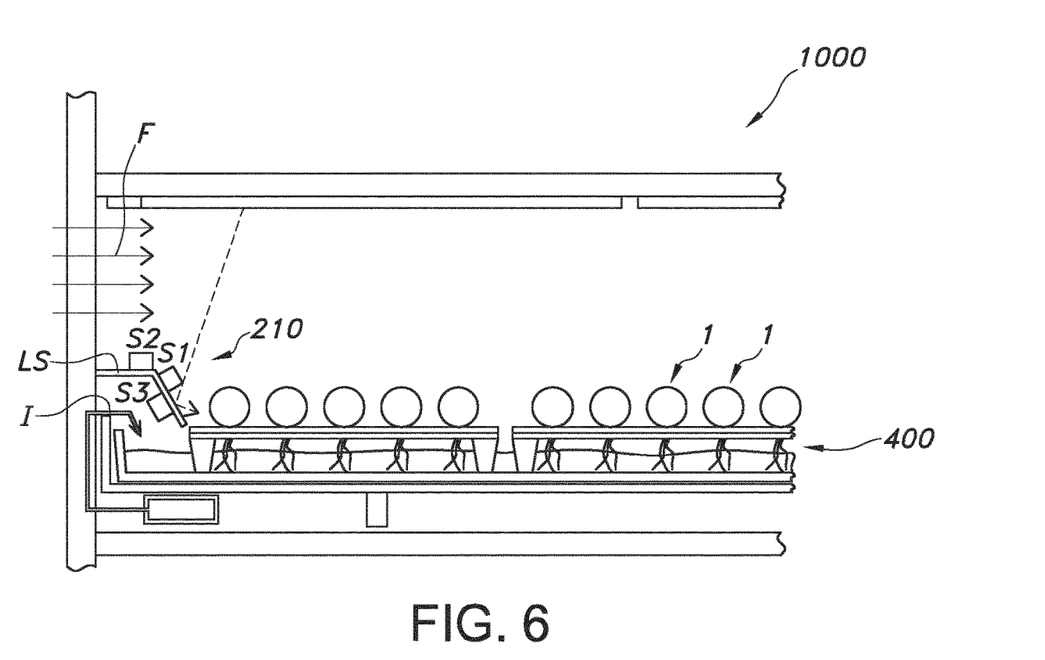
FIG. 6 schematically shows a further embodiment. This figure shows part of a cross section along the width of a growth layer. The layer contains containers (rolling benches, rolling in and out of the plane of the drawing). In each container there is a plastic inlay containing the irrigation water. Trays with plants are positioned in each inlay. At the side where the air for ventilation and $CO_2$ supply enters the layer, there is a shield.

A further embodiment will be discussed with reference to FIG. 6. Here, F indicates an optional air flow; LS indicates a light shield, and I indicates an irrigation water inlet. This embodiment describes a shield that has the following functions:

It prevents light from reaching the irrigation water, in order to prevent algae growth.

It is used to mount sensors, such as sensors to determine properties of the light such as the gain factor (sensor Si in the figure) as well as other properties relevant for plant growth (sensor S2: temperature, relative humidity, air speed, $CO_2$ level), or properties of the irrigation water (sensor S3: water temperature, water level, $O_2$ content of water).

The shield prevents direct airflow against the crop at the edge of the growth layer.

In addition:

It is recommended to install shields at both edges of each growth layer.

The shields are made to (specularly or diffusely) reflect light: this will improve the light utilization factor and crop uniformity at the edges.

The shield can be used as a mechanical support for the irrigation supply pipes.

Therefore, in an aspect the invention also provides a horticulture arrangement for a plant, the horticulture arrangement comprising (i) a horticulture lighting system configured to provide horticulture light to plants, (ii) one or more reflective elements configured to reflect part of the horticulture light to the plant, and (iii) a control system, wherein the control system is configured to control one or more of a light intensity and a spectral distribution of the horticulture light in dependence of an estimated or measured gain (factor). In yet an aspect the invention also provides a horticulture lighting system, comprising one or more lighting devices (especially a plurality of lighting devices) configured to provide horticulture light (to plants), and (ii) a control system, and (iii) optionally one or more sensors, wherein the control system is configured to control one or more of a light intensity and a spectral distribution of the horticulture light in dependence of an estimated or measured gain (factor), which gain (factor) may be estimated or measured on the basis of one or more sensor signals of the one or more sensors. Also, in an aspect the invention also provides a method of providing horticulture light to plants in a horticulture arrangement comprising one or more reflective elements, the method comprising providing the horticulture light to plants and controlling one or more of a light intensity and a spectral distribution of the horticulture light in dependence of an estimated or measured gain (factor). As indicated above, the gain (factor) may be estimated or measured on the basis of one or more sensor signals of one or more sensors. Embodiments in relation to this arrangement, lighting system, and/or method are—amongst others—described above.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A horticulture arrangement for plants, the horticulture arrangement comprising:
 a horticulture lighting system comprising one or more lighting devices configured to provide horticulture light;
 one or more reflective elements configured to reflect part of the horticulture light to provide reflected horticulture light, where the extent to which the horticulture light is reflected by the one or more reflective elements is expressed by a gain factor, wherein the gain factor is determined using a predetermined gain function; and
 a control system, wherein the control system is configured to control one or more of a light intensity and a spectral distribution of the horticulture light,
 wherein the control system in configured to control the one or more of the light intensity and the spectral distribution of the horticulture light in dependence on the extent to which the horticulture light is reflected by the one or more reflective elements, and wherein the control system is configured to control one or more of the light intensity and the spectral distribution of the horticulture light in an inverse proportional relationship with the gain factor.

2. The horticulture arrangement according to claim 1, wherein at least part of the reflected horticulture light is directed in the direction of the one or more lighting devices, wherein one or more first reflective elements are configured to reflect at least a part of the reflected horticulture light directed in the direction of the one or more lighting devices back to the plants.

3. The horticulture arrangement according to claim 1, comprising a structure for hosting the plants, wherein the structure comprises plant positions where the plants can be positioned, and intermediate parts between the plant positions, wherein one or more intermediate parts comprise one or more second reflective elements.

4. The horticulture arrangement according to claim 1, wherein the control system is configured to control the horticulture light according to a predefined light recipe, wherein the light recipe includes information on one or more of (i) intensity of the horticulture light as function of time, and (ii) spectral distribution of the horticulture light as function of time, whereby the light recipe defines one or more of a target light intensity and spectral distribution of the horticulture light, and wherein the control system is further configured to control one or more of the light intensity and spectral distribution of the horticulture light in dependence on one or more of the target light intensity and spectral distribution of the horticulture light and the extent to which the horticulture light is reflected by the one or more reflective elements.

5. The horticulture arrangement according to claim 1, wherein the control system is configured to control the intensity of the horticulture light according to a light recipe with a target intensity of the horticulture light, and wherein the control system is configured to adapt the horticulture light intensity of the horticulture light according to the light recipe on the basis of a predetermined relation between light intensity in $\mu mol/s/m^2$ provided by the horticulture lighting system and light intensity effectively received by the plants.

6. The horticulture arrangement according to claim 1, comprising one or more optical sensors configured to sense reflected horticulture light and to generate one or more corresponding optical sensor signals, wherein the one or more optical sensors comprise sensor surfaces, wherein the sensor surfaces are configured to receive no direct horticulture light, and
 wherein the horticulture arrangement is configured for growth of plants in a growth medium, wherein one or more lighting devices are arranged above the growth medium at a lighting device height of from the growth medium, and wherein one or more first optical sensors are arranged at a sensor height selected from the range of 0-40% of the lighting device height, and wherein the one or more first optical sensors are configured with sensor surfaces directed upwards.

7. The horticulture arrangement according to claim 6, wherein the horticulture arrangement is configured for growth of plants in a growth medium, wherein one or more lighting devices are arranged above the growth medium at a lighting device height of from the growth medium, and wherein one or more second optical sensors are arranged at a sensor height selected from the range of 50-150% of the lighting device height, wherein the one or more second optical sensors are configured with sensor surfaces directed downwards.

8. A horticulture arrangement for plants, the horticulture arrangement comprising:
   a horticulture lighting system comprising one or more lighting devices configured to provide horticulture light;
   one or more reflective elements configured to reflect part of the horticulture light to provide reflected horticulture light; and
   a control system, wherein the control system is configured to control one or more of a light intensity and a spectral distribution of the horticulture light,
   wherein the control system in configured to control the one or more of the light intensity and the spectral distribution of the horticulture light in dependence on the extent to which the horticulture light is reflected by the one or more reflective elements, and
   one or more optical sensors configured to sense reflected horticulture light and to generate one or more corresponding optical sensor signals and wherein the extent to which the horticulture light is reflected by the one or more reflective elements is expressed by a gain factor determined using the one or more corresponding optical sensor signals, and wherein the control system is configured to control one or more of the light intensity and the spectral distribution of the horticulture light in an inverse proportional relationship with the gain factor.

9. The horticulture arrangement according to claim 8, wherein the one or more optical sensors comprise sensor surfaces, wherein the sensor surfaces are configured to receive no direct horticulture light.

10. The horticulture arrangement according to claim 8, wherein the horticulture arrangement is configured for growth of plants in a growth medium, wherein one or more lighting devices are arranged above the growth medium at a lighting device height of from the growth medium, and wherein one or more first optical sensors are arranged at a sensor height selected from the range of 0-40% of the lighting device height, and wherein the one or more first optical sensors are configured with sensor surfaces directed upwards.

11. The horticulture arrangement according to claim 8, wherein the horticulture arrangement is configured for growth of plants in a growth medium, wherein one or more lighting devices are arranged above the growth medium at a lighting device height of from the growth medium, and wherein one or more second optical sensors are arranged at a sensor height selected from the range of 50-150% of the lighting device height, wherein the one or more second optical sensors are configured with sensor surfaces directed downwards.

12. The horticulture arrangement according to claim 8, wherein at least part of the reflected horticulture light is directed in the direction of the one or more lighting devices, wherein one or more first reflective elements are configured to reflect at least a part of the reflected horticulture light directed in the direction of the one or more lighting devices back to the plants.

13. The horticulture arrangement according to claim 8, comprising a structure for hosting the plants, wherein the structure comprises plant positions where the plants can be positioned, and intermediate parts between the plant positions, wherein one or more intermediate parts comprise one or more second reflective elements.

14. The horticulture arrangement according to claim 8, wherein the control system is configured to control the horticulture light according to a predefined light recipe, wherein the light recipe includes information on one or more of (i) intensity of the horticulture light as function of time, and (ii) spectral distribution of the horticulture light as function of time, whereby the light recipe defines one or more of a target light intensity and spectral distribution of the horticulture light, and wherein the control system is further configured to control one or more of the light intensity and spectral distribution of the horticulture light in dependence on one or more of the target light intensity and spectral distribution of the horticulture light and the extent to which the horticulture light is reflected by the one or more reflective elements.

15. A method of providing horticulture light to plants in a horticulture arrangement comprising one or more reflective elements configured to reflect part of the horticulture light to provide reflected horticulture light, the method comprising providing the horticulture light to the plants and controlling one or more of a light intensity and a spectral distribution of the horticulture light, and
   wherein controlling the one or more of the light intensity and the spectral distribution of the horticulture light in dependence on the extent to which the horticulture light is reflected by the one or more reflective elements, and where the extent to which the horticulture light is reflected by the one or more reflective elements is expressed by a gain factor, wherein the gain factor is determined using a predetermined gain function, and wherein the control system is configured to control one or more of the light intensity and the spectral distribution of the horticulture light in an inverse proportional relationship with the gain factor.

16. The method according to claim 15, the method comprising controlling the horticulture light according to a predefined light recipe, wherein the light recipe includes information on one or more of (i) intensity of the horticulture light as function of time, and (ii) spectral distribution of the horticulture light as function of time, whereby the light recipe defines a target horticulture light intensity, and controlling the one or more of the light intensity and spectral distribution of the horticulture light in dependence on the target horticulture light intensity the extent to which the horticulture light is reflected by the one or more reflective elements.

17. The method according to claim 15, wherein at least part of the reflected horticulture light is directed in the direction of the one or more lighting devices, wherein one or more first reflective elements are configured to reflect at least a part of the reflected horticulture light directed in the direction of the one or more lighting devices back to the plants.

18. The method according to claim 15, wherein the horticulture arrangement comprises a structure for hosting the plants, wherein the structure comprises plant positions where the plants can be positioned, and intermediate parts between the plant positions, wherein one or more intermediate parts comprise one or more second reflective elements.

19. The method according to claim 15, wherein the horticulture arrangement comprises one or more optical sensors configured to sense reflected horticulture light and to generate one or more corresponding optical sensor signals, wherein the one or more optical sensors comprise sensor surfaces, wherein the sensor surfaces are configured to receive no direct horticulture light, and wherein the horticulture arrangement is configured for growth of plants in a growth medium, wherein one or more lighting devices are arranged above the growth medium at a lighting device height of from the growth medium, and wherein one or more first optical sensors are arranged at a sensor height selected from the range of 0-40% of the lighting device height, and wherein the one or more first optical sensors are configured with sensor surfaces directed upwards, and wherein the horticulture arrangement is configured for growth of plants in a growth medium, wherein one or more lighting devices are arranged above the growth medium at a lighting device height of from the growth medium, and wherein one or more second optical sensors are arranged at a sensor height selected from the range of 50-150% of the lighting device height, wherein the one or more second optical sensors are configured with sensor surfaces directed downwards.

20. A non-transitory computer readable medium having stored thereon software instructions that, when executed by a processor, perform the method of claim 15.

* * * * *